United States Patent
Huang et al.

(10) Patent No.: US 7,356,378 B1
(45) Date of Patent: Apr. 8, 2008

(54) METHOD AND SYSTEM FOR SMART VEHICLE ROUTE SELECTION

(75) Inventors: Chih-Wei Huang, Hsinchu County (TW); Hui-Yi Chen, Taoyuan County (TW); Ren-Chyi Yu, Yilan County (TW); Chuh-Yuan Yu, ChangHua County (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 0 days.

(21) Appl. No.: 11/695,988

(22) Filed: Apr. 3, 2007

(51) Int. Cl.
*G06F 7/00* (2006.01)
(52) U.S. Cl. ............... 700/112; 700/213; 700/228; 701/202
(58) Field of Classification Search ........... 700/100, 700/112, 213, 223, 228; 701/201, 202, 209; 438/14
See application file for complete search history.

(56) References Cited

U.S. PATENT DOCUMENTS

| | | | |
|---|---|---|---|
| 5,797,113 A | 8/1998 | Kambe et al. | |
| 6,356,838 B1 | 3/2002 | Paul | |
| 6,516,266 B2 | 2/2003 | Shoji | |
| 6,647,316 B2 | 11/2003 | Bahri et al. | |
| 7,177,716 B2 * | 2/2007 | Duffin et al. | 700/112 |
| 7,274,971 B2 * | 9/2007 | Brill et al. | 700/230 |
| 2004/0039469 A1 * | 2/2004 | Lin | 700/100 |
| 2004/0073331 A1 * | 4/2004 | Chang et al. | 700/223 |

OTHER PUBLICATIONS

Jeff Wehnes, Material Control System (MCS) Requirements Specification, SEMATECH Technology Transfer 95042784A-STD, Apr. 30, 1995 (14 pages).
Elsevier Science, New York, NY http://www/elsevier.nl/homepage/browse.htt, SEMI E82-0703, Specification for Interbay/Intrabay AMHS SEM (IBSEM), Jul. 2003, (10 pages).

* cited by examiner

*Primary Examiner*—Leo Picard
*Assistant Examiner*—Douglas S Lee
(74) *Attorney, Agent, or Firm*—Haynes Boone, LLP (57) ABSTRACT

In one aspect a factory automation system for a wafer fab is provided. The factory automation system comprises: a manufacturing execution system ("MES") for providing lot information; a material control system ("MCS") for providing dynamic traffic information; an automated material handling system ("AMHS") for providing static route information; and a real-time dispatching ("RTD") system to select a destination and a route for a wafer carrier in response to a transfer request. In another aspect a method of transferring a wafer lot within a wafer fabrication facility ("fab") using a factory automation system is provided. The method comprises: receiving a transfer request to move the wafer lot from a first position to a second position within the fab; obtaining lot information, dynamic traffic information, and static traffic information; using the information to select a route between the first position and the second position; and executing the transfer using the selected route.

21 Claims, 9 Drawing Sheets

Fig. 7

METHOD AND SYSTEM FOR SMART VEHICLE ROUTE SELECTION

BACKGROUND

The manufacture of semiconductor devices involves the performance of a series of process steps using a variety of high tech production and metrology tools in a certain order and often within a certain period of time. The primary function of a wafer logistics system in a wafer fabrication facility, or "fab," is to deliver the wafers to each of the tools at the right time, as well as to track the location and status of the wafers throughout the process.

Automated material handling systems ("AMHS") are applied to wafer fabs to carry out the automated functions more efficiently, consistently, and safely than can be done via manual means. While growth in wafer size from 200 mm to 300 mm has rendered the fabrication process more economical in some respects, it has also placed additional demands on the process. Such demands include the necessity for cross-floor and cross-phase transportation and increased transportation volume, the combination of which often results in traffic jams. Additionally, the investment in the AMHS hardware is large.

When a wafer carrier, such as a front opening unified pod ("FOUP"), containing wafers is to be transferred, a manufacturing execution system ("MES") determines to what destination in the fab the wafer carrier should be transferred. Once the destination decision has been made, the MES sends a transfer request to a material control system ("MCS"), which calculates a detailed transportation route using a route search engine and then notifies a transfer manager to execute the transfer step-by-step.

Although existing systems and methods have been generally adequate for their intended purposes, they have not been entirely satisfactory in all respects.

DETAILED DESCRIPTION

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

It is understood that the following disclosure provides many different embodiments, or examples, capable of implementing different features. Specific examples of components and arrangements are described below to simplify and thus clarify the present disclosure. These are, of course, merely examples and are not intended to be limiting. In many instances, the features of one embodiment may be combined with the features of other embodiments. In addition, the present disclosure may repeat reference numerals and/or letters in the various exemplary embodiments. This repetition is for the purpose of simplicity and clarity and does not in itself dictate a relationship between the various embodiments and/or configurations discussed.

Figure 1:
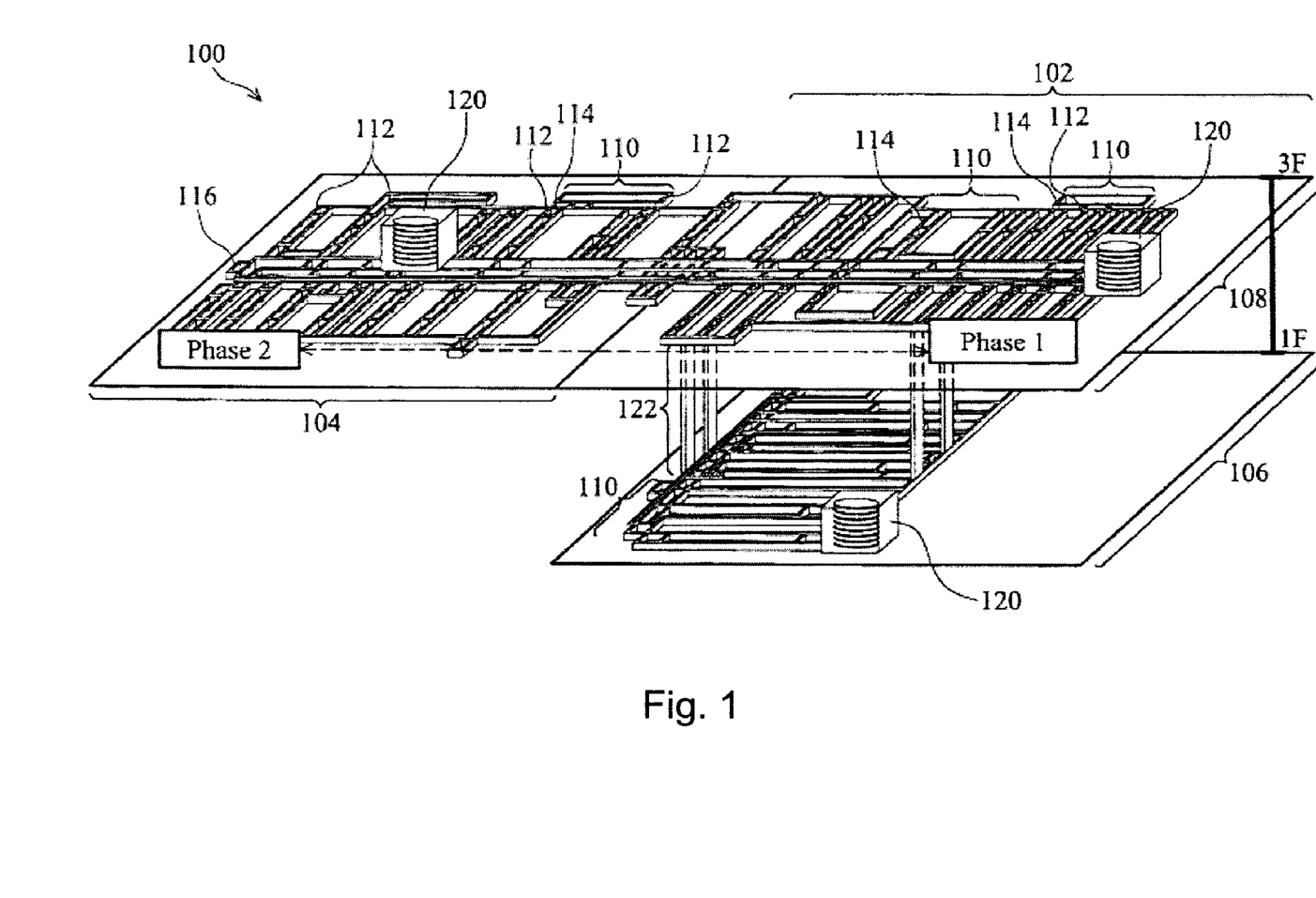
FIG. 1 is a diagram illustrating a wafer fab in accordance with one embodiment.

FIG. 1 is a diagram illustrating a wafer fab 100 in accordance with one embodiment. The fab 100 may be referred to as a "Gigafab" as it includes multiple phases, respectively designated in FIG. 1 by reference numerals 102 and 104, and multiple floors, respectively designated in FIG. 1 by reference numerals 106 and 108. A "cross-floor transfer job" involves the transfer of a wafer carrier, or FOUP, from one of the floors 106, 108, to the other. Similarly, a "cross-phase transfer job" involves the transfer of a wafer carrier, or FOUP, from one of the phases 102, 104, to the other. In some embodiments, the wafer fab 100 is a 300 mm wafer fab.

Each phase 102, 104, includes a plurality of bays 110 each comprising process tools, or equipment, 112. The equipment 112 within each bay 110 is interconnected in by an intrabay overhead transport ("OHT") system 114. The bays 110 are interconnected via an interbay OHT system 116, which is alternatively referred to herein as a "super highway". As will be familiar to those of ordinary skill in the relevant art, the intrabay OHT systems 114 and the interbay OHT system 116 comprise overhead tracks on which OHT vehicles 118 (see FIG. 2) transport FOUPs containing lots of wafers to be processed to and from equipment 112, often via stockers 120. A cross-floor transportation system 122 comprising lifters is also provided for implementing cross-floor transfer of FOUPs.

Figure 2:
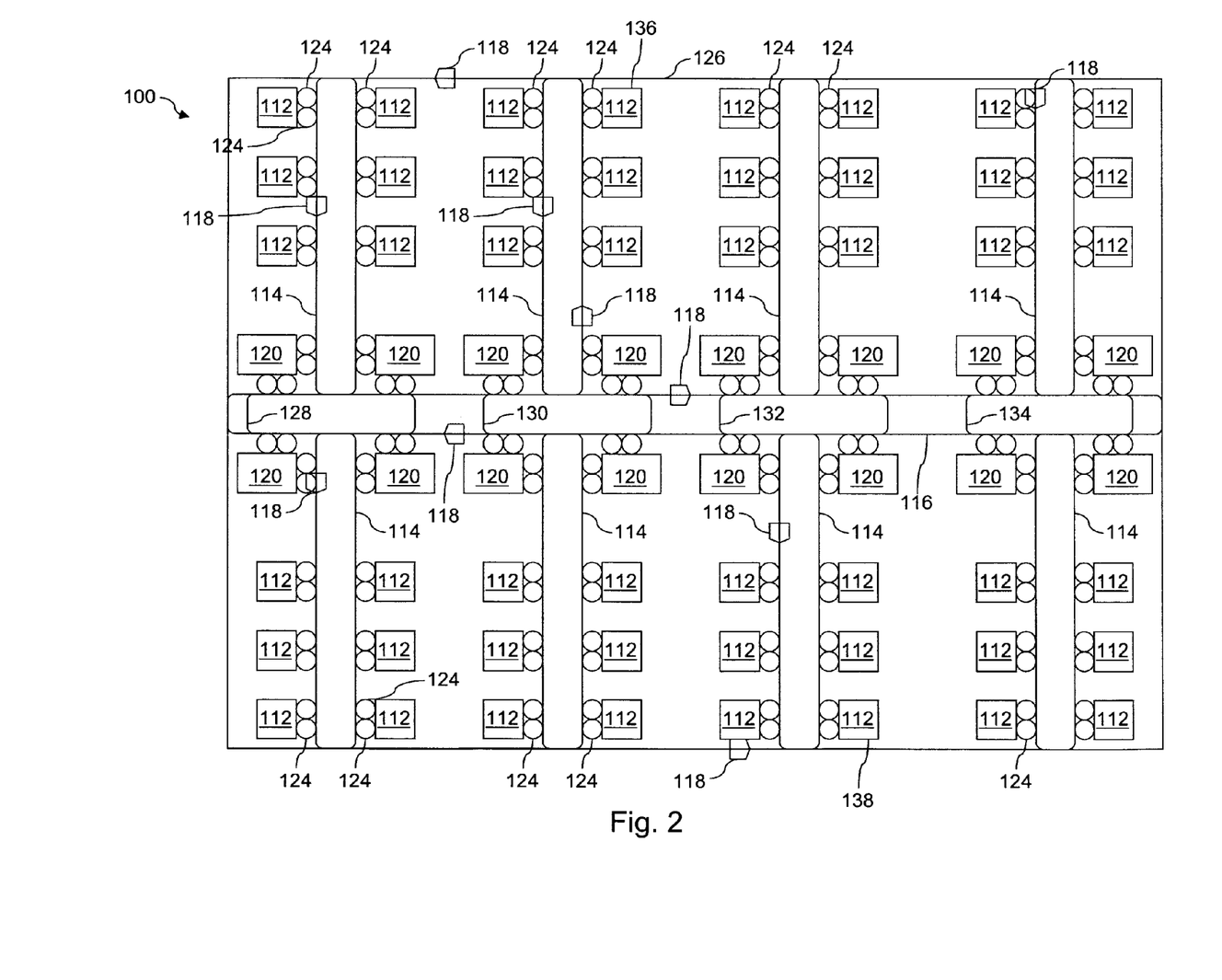
FIG. 2 is a simplified diagram of the transport system of one phase of the wafer fab of FIG. 1.

FIG. 2 is a simplified diagram of a transport system of one phase, e.g., the phase 104, of the fab 100. As shown in FIG. 2, the tools 112 and the stockers 120 include loading ports 124 for receiving the FOUPs (not shown). As shown in FIG. 2, in addition to being interconnected via the interbay OHT system 116, the intrabay OHT systems 114 may also be interconnected by an additional OHT system(s) that includes tracks 126, 128, 130, 132, and 134. In some embodiments, the additional tracks 126, 128, 130, 132, and 134 are part of the intrabay OHT system 114 and/or the interbay OHT system 116. The OHT systems 114 and 116 along with the tracks 126, 128, 130, 132, and 134 provide a framework for transporting FOUPs between the tools 112 of the fab 100. As will be described in greater detail below, in accordance with an embodiment described herein, assuming a FOUP is to be transferred from a location 136 to a location 138 in the fab 100, the FOUP may be routed between the locations 136, 138 based on numerous manufacturing parameters and rules, including lot priority, lot information, tool information, processing conditions, traffic conditions, available routes, manual instructions, and other factors. It will be recognized that transportation of a FOUP from between the locations 136, 138 within the fab 100 can be accomplished using multiple pathways and/or multiple tracks within the OHT systems. In that regard, it will also be recognized that the shortest route between two points may not always be the fastest route due to such factors as traffic conditions, speed of the OHT system(s), and other manufacturing logistics.

Figure 3A:
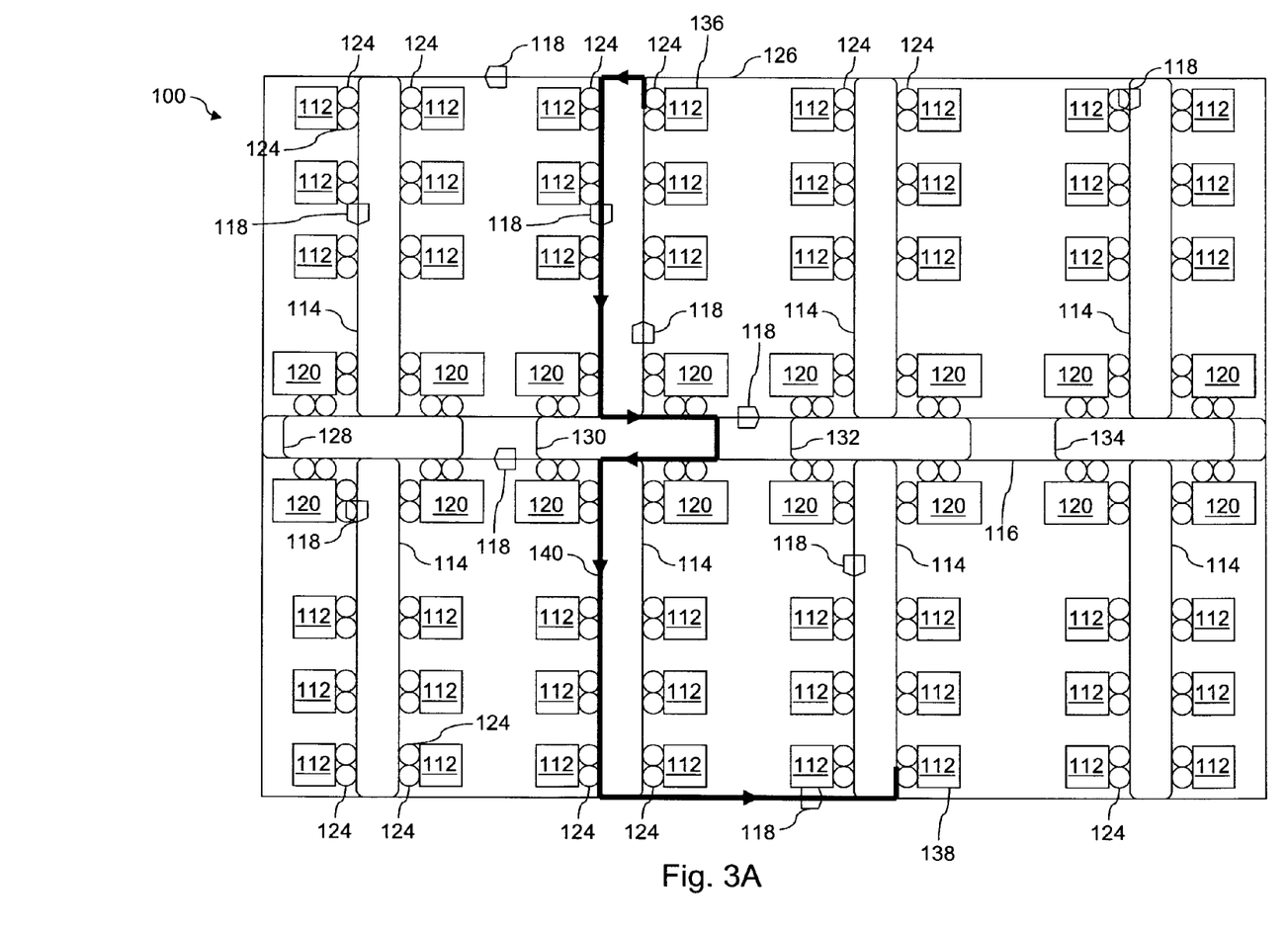
FIG. 3A is the simplified diagram of the transport system of FIG. 2 showing a possible path between two locations within the wafer fab.
Figure 3B:
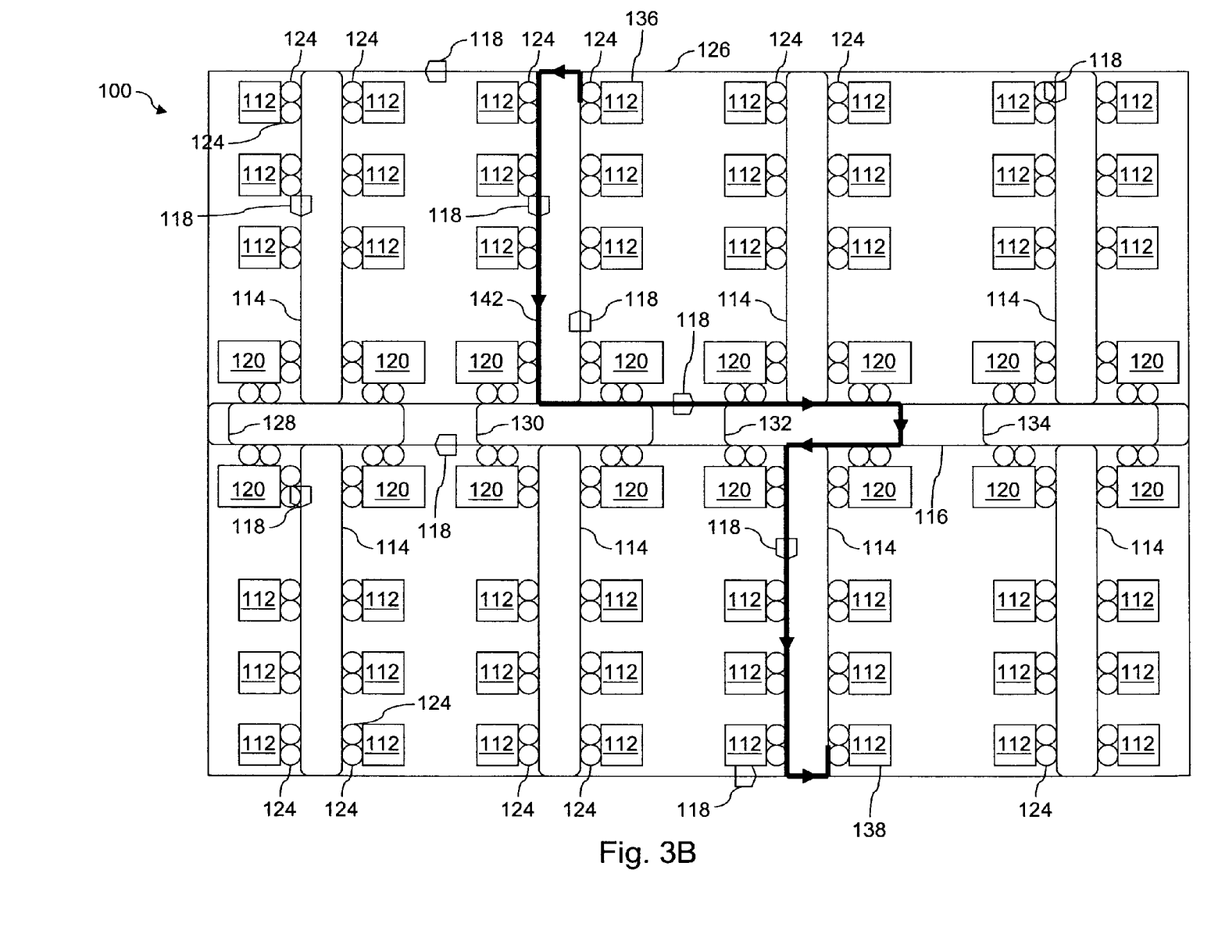
FIG. 3B is the simplified diagram of the transport system of FIG. 2 showing another possible path between two locations within the wafer fab.
Figure 3C:
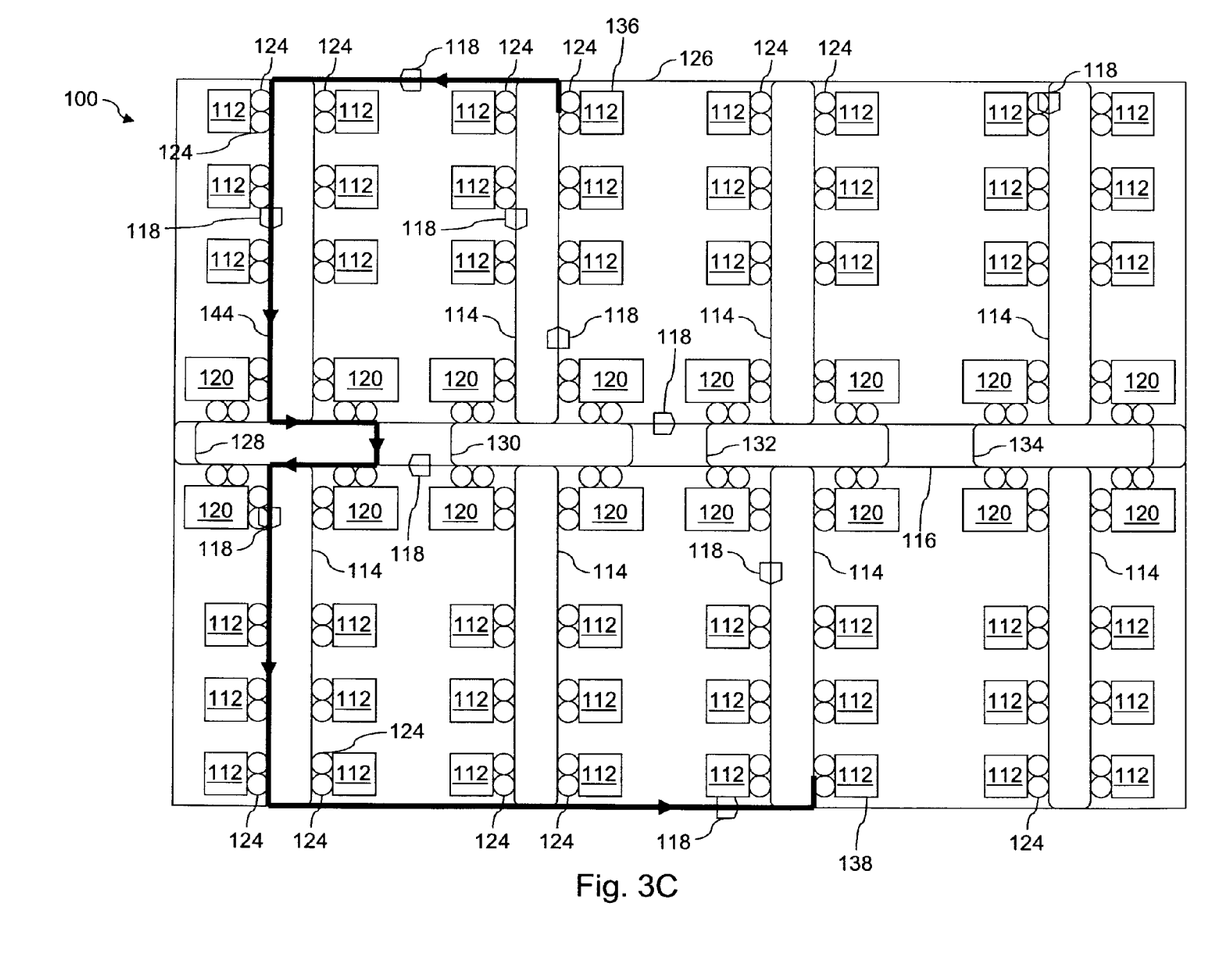
FIG. 3C is the simplified diagram of the transport system of FIG. 2 showing another possible path between two locations within the wafer fab.
Figure 3D:
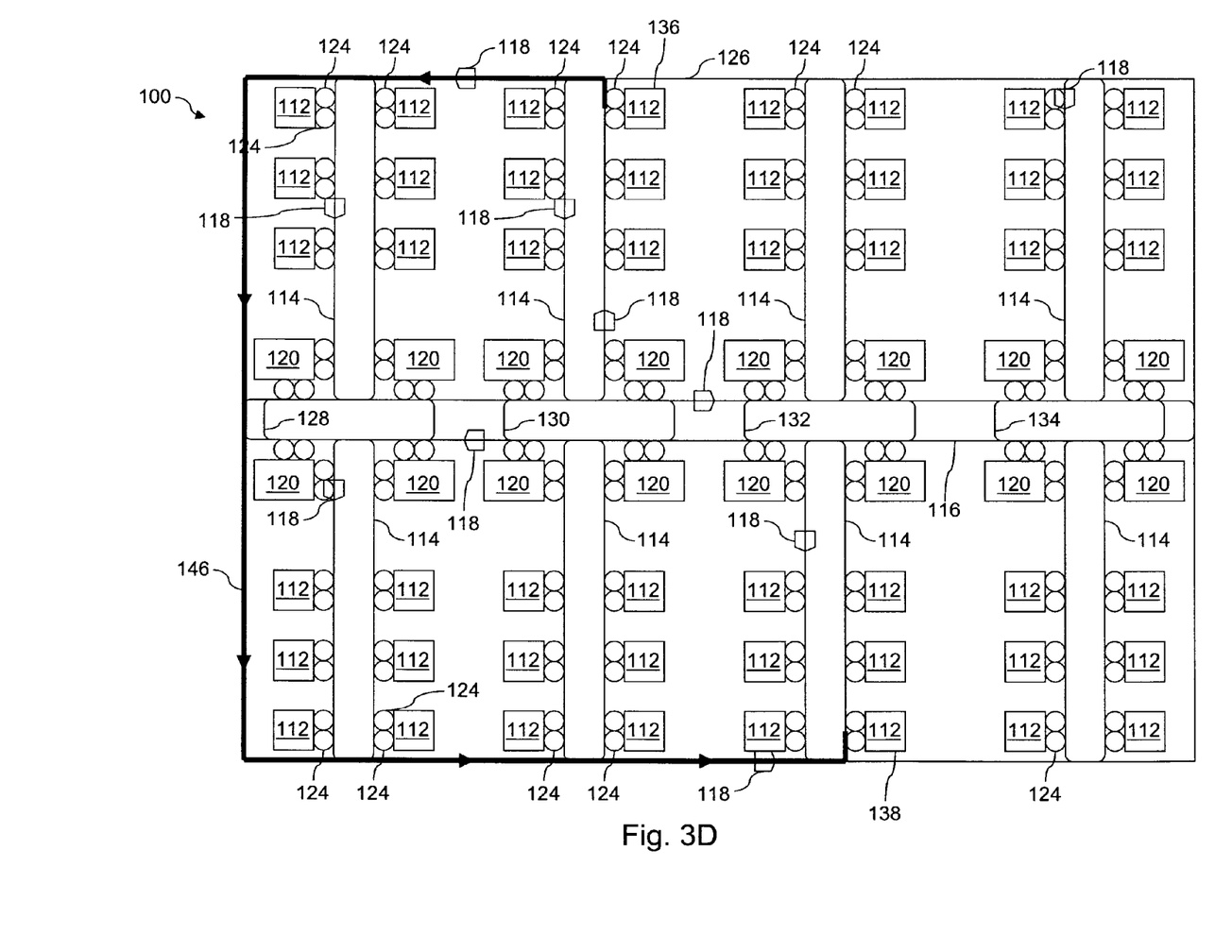
FIG. 3D is the simplified diagram of the transport system of FIG. 2 showing another possible path between two locations within the wafer fab.

Referring to FIGS. 3A-3D, shown therein are examples of alternative paths 140, 142, 144, and 146 that a FOUP could take between locations 136 and 138. Referring more specifically to FIG. 3A, shown therein is the path 140 between location 136 and location 138. Referring more specifically to FIG. 3B, shown therein is the path 142 between location 136 and location 138. Referring more specifically to FIG. 3C, shown therein is the path 144 between location 136 and location 138. Referring more specifically to FIG. 3D, shown therein is the path 146 between location 136 and location 138. The paths 140, 142, 144, and 146 each have a different length between the locations 136 and 138. In particular, path 140 has a length less than path 142; path 142 has a length less than path 144; and path 144 has a length less than path 146. Thus, considering only paths 140, 142, 144, and 146, path 140 may be considered the shortest route; path 142 may be considered the second shortest route; path 144 may be considered the third shortest route; and path 146 may be considered the fourth shortest route. For the sake of clarity, the paths 140, 142, 144, and 146 will be referred to throughout this description. However, the paths 140, 142, 144, and 146 are merely examples and should not be considered limiting to the available paths of travel between location 136 and location 138. There may be numerous other available paths of travel between the locations 136, 138. Further, the additional paths may have lengths greater than, less than, or equal to the lengths of the paths 140, 142, 144, and 146.

Figure 4:
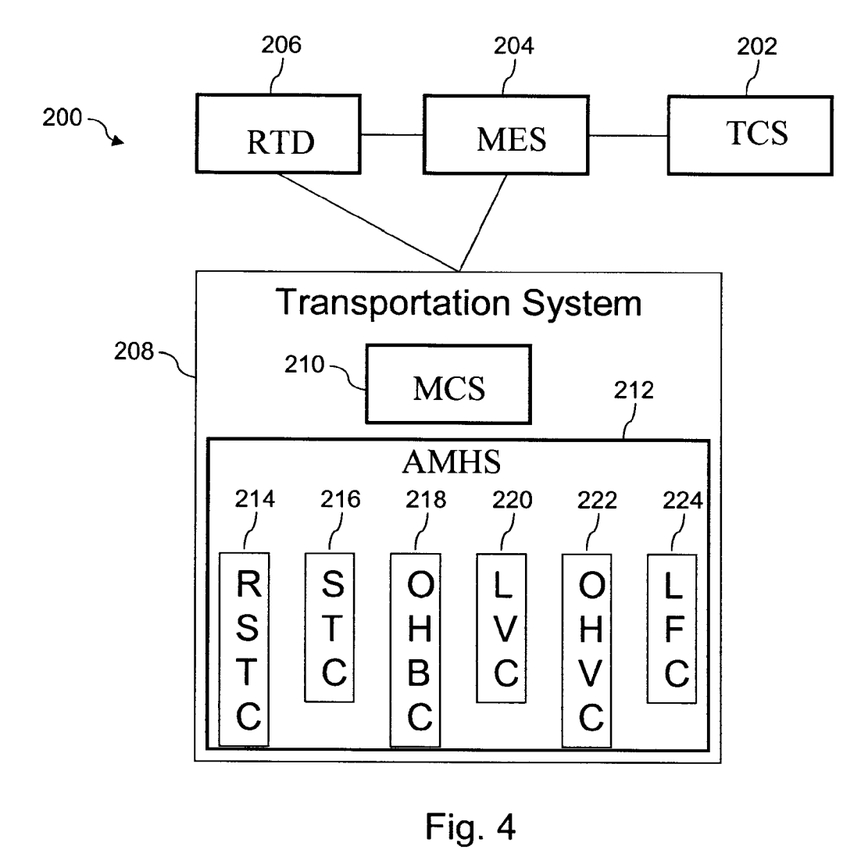
FIG. 4 is a block diagram illustrating a factory automation system that may be implemented in the fab of FIG. 1 in accordance with one embodiment.

FIG. 4 is a block diagram illustrating a factory automation system 200 that may be implemented in the fab 100 illustrated in FIG. 1 in accordance with one embodiment of the present disclosure. The factory automation system 200 includes a tool controller system ("TCS") 202, a manufacturing execution system ("MES") 204, a real-time dispatching system ("RTD") 206, and a transportation system 208. The transportation system 208 includes a material control system ("MCS") 210 and an automated material handling system ("AMHS") 212. The AMHS 212 includes a plurality of control modules, such as a reticle stocker controller ("RSTC") 214, a stocker controller ("STC") 216, an overhead buffer controller ("OHBC") 218, an inter-bay OHS controller ("LVC") 220, an intra-bay OHT controller ("OHVC") 222, and a lifter controller ("LFC") 224. The AMHS 212 can include additional, fewer, and different control modules in other embodiments.

As shown in FIG. 4, the TCS 202 is communication with the MES 204. The MES 204, the RTD 206, and the transportation system 208 are in communication with one another. The communication between the TCS 202, the MES 204, the RTD 206, and the transportation system 208 may be accomplished through any suitable method including wired and wireless connections, including but not limited to computer network and telecommunications networks. The TCS 202 is adapted to send a cassette delivery request to the MES 204. Responsive to the delivery request, the MES 204 determines the appropriate destination and generates a transfer request to move a FOUP between locations in the fab 100. Continuing the example from above, assume that the FOUP is to be moved between the location 136 and the location 138. Utilizing the static and dynamic data available from the MES 204 and the transportation system 208, the RTD 206 determines an appropriate route for the FOUP based on a set of RTD rules. Again continuing the example from above, assume that the RTD 206 selects between the paths 140, 142, 144, and 146. In that regard, the RTD 206 may send multiple micro commands (MMCs) defining the appropriate transfer path to the transportation system 208 for execution. The RTD rules are utilized to determine the appropriate order of execution and appropriate routes for transferring FOUPs between locations within the fab 100. The RTD rules can be implemented or changed by a manufacturing engineer. The RTD rules can be modified or updated over time to account for changes in the manufacturing process, to further streamline the manufacturing process, to further reduce traffic, or for any other reason. The static and dynamic data utilized by the RTD 206 may include lot information, priority information, available transport systems, available routes, traffic conditions, and other available information. The static and dynamic data may be stored in a database or kernel accessible by the RTD 206. In that regard, the dynamic data—data that changes over time—may be continuously updated in real-time or at a specified interval for use by the RTD 206. In some embodiments, the RTD 206 may continuously monitor the status of a transfer and update or change the transfer path based on the dynamic data. In some embodiments, the RTD 206 communicates with the MES 204 using a real time dispatcher for material management ("MMRTD"). In some embodiments, the MMRTD handles lot dispatching for tools and communicates with the transportation system 208 and, in particular, the MCS 210 using real time dispatcher for transfer management ("XMRTD"). In some embodiments, XMRTD is utilized to create multiple micro commands (MMCs) for lot transporting. In some embodiments, the MMRTD and the XMRTD are two separate RTD systems and may serve different purposes. For example, the MMRTD may be the RTD for the MES 204 while the XMRTD is the RTD for the MCS 210.

In at least one aspect, the factory automation system 200 routes lots and/or reduces traffic to ensure the timely transportation of super hot lots and higher priority lots between tools and/or phases of the manufacturing process. In one embodiment, this is accomplished using static traffic control techniques to force transfers of FOUPs containing control wafer ("CW") lots to use longer transfer paths (e.g., path 146). In some embodiments, this is further accomplished through the use of real-time traffic control techniques to send the super hot lots and higher priority lots on longer transfer paths with less traffic than the shorter paths, such that the super hot lots and higher priority lots will arrive at the destination location faster than if sent along the shortest route. In some embodiments, the factory automation system 200 may also include an integrated transportation control system as described in U.S. Provisional patent application Ser. No. 11/458,554, filed Jul. 19, 2006 and herein incorporated by reference in its entirety. In such embodiments, the functions of the RTD 206 may be used in combination with the functions of the integrated transportation control system to further reduce traffic and ensure the timely transportation of higher priority lots between tools and/or phases of the manufacturing process.

Figure 5:
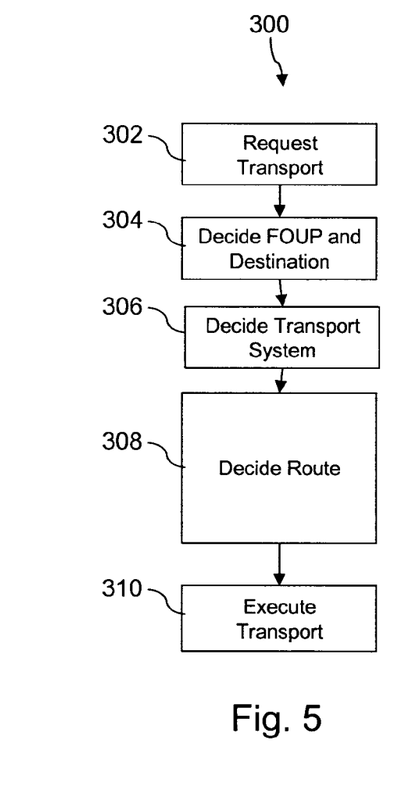
FIG. 5 is a flowchart illustrating a method of vehicle route selection in accordance with one embodiment.

FIG. 5 is a flowchart illustrating a method 300 of vehicle route selection in accordance with one embodiment. The method 300 begins with step 302 with a transport request. The transport request will indicate that a wafer lot should be transferred from one location, tool, or phase of the fab to another. In response to the transport request, in step 304, the factory automation system 200 decides on an appropriate vehicle or FOUP and destination for the wafer lot. The appropriate FOUP and destination may be determined by looking at such factors as the lot and tool information as well as other factors. In some embodiments the FOUP and destination are determined based on information available from the MES 204. Once the FOUP and destination have been determined, in step 306, the factory automation system 200 decides on an appropriate transport system. Continuing the system example from above, factory automation system 200 might choose between the intrabay OHT system 114, the interbay OHT system 116, or another transport system. The appropriate transport system may be determined by looking at such factors as the static and dynamic traffic conditions as well as other factors. In some embodiments the appropriate transport system is determined based on information available from the transportation system 208. Once the transport system has been determined, in step 308, the factory automation system 200 and, in particular, the RTD 206 decides on an appropriate route or path for transferring the lot. As described above, the appropriate route may be determined by looking at such factors as lot information, priority information, transport paths, path distances, static and dynamic traffic conditions, and other available information. Once the route has been determined, in step 310, the factory automation system 200 and, in particular, the transportation system 208 executes the transport of the lot.

Figure 6:
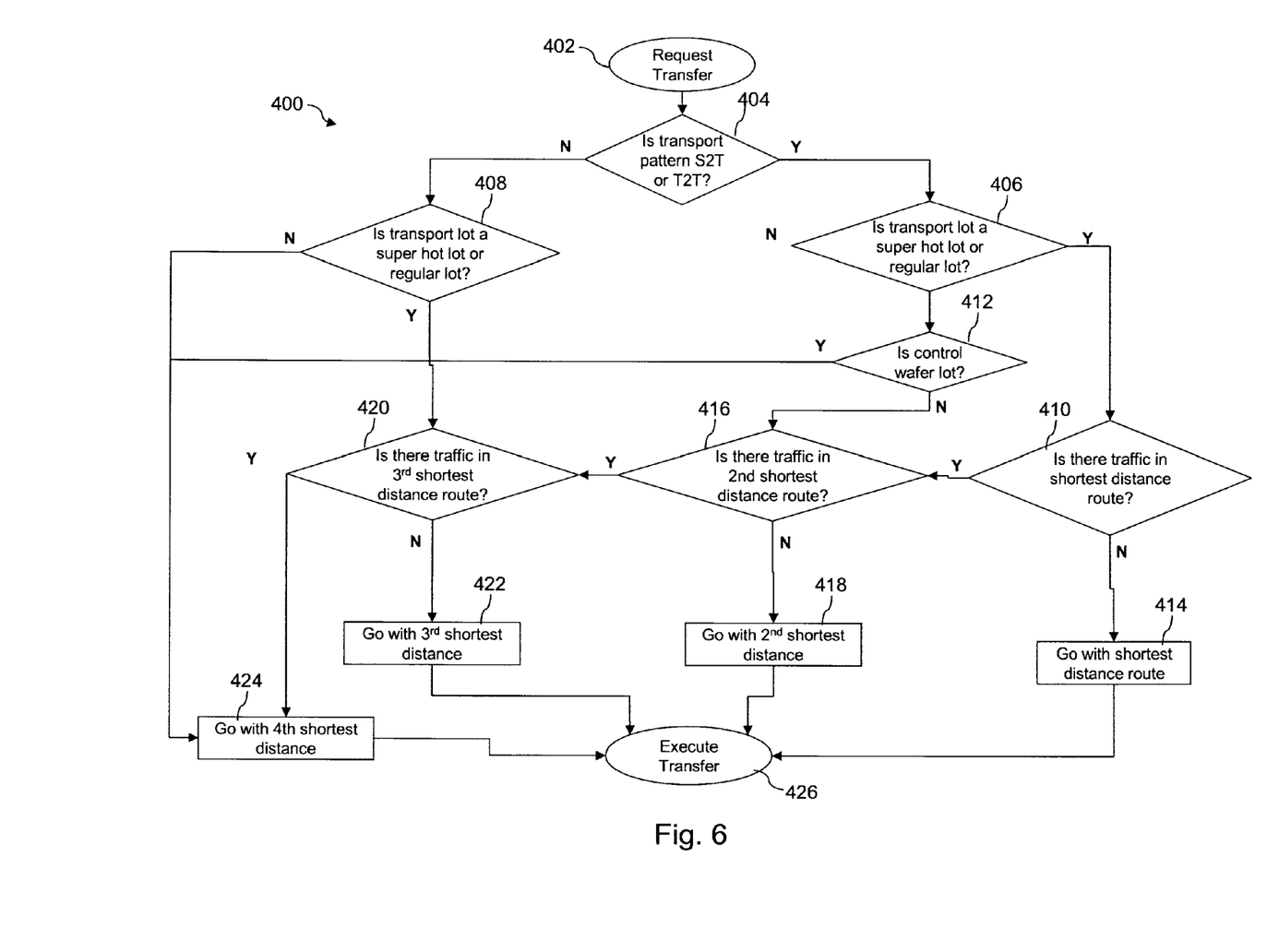
FIG. 6 is a flowchart illustrating a method of selecting a transfer path for a wafer lot in accordance with one embodiment.

FIG. 6 is a flowchart illustrating a method 400 of selecting a transfer path for a lot in accordance with one embodiment. In some embodiments, at least some steps of the method 400 are used as all or a part of step 308 of the method 300 of FIG. 5. The method 400 begins with step 402 with a transfer request. The transfer request will indicate that a wafer lot should be transported from one location, tool, or phase of the fab to another. For the sake of example, we will continue the example from above where the lot is to be moved between locations 136 and 138 via paths 140, 142, 144, or 146. In response to the transfer request, the method 400 continues through a series of determinations for deciding on the most appropriate route for the lot transfer. In particular, the method 400 continues with step 404 in which it is determined whether the lot transfer is a tool-to-tool ("T2T") transport or a stocker-to-tool ("S2T") transport. If the lot transfer is a T2T or a S2T transport, then the method 400 continues to step 406. If the lot transfer is not a T2T or a S2T transport, such as a tool-to-stocker ("T2S") transport or a stocker-to-stocker ("S2S") transport, then the method 400 continues to step 408.

At step 406, the method 400 continues by determining whether the lot to be transported is a super-hot lot or a regular lot. If the lot is a super-hot lot or a regular lot, then the method 400 continues to step 410. If the lot is not a super-hot lot or a regular lot, such as a control wafer lot, then the method 400 continues to step 412. At step 410, the method continues by determine whether there is traffic in the route 140 having the shortest distance between the locations 136 and 138. In this regard, determining whether there is traffic in a particular route can be based on several factors such as the number of lots using the route and/or the increase in time it will take to follow the route due to the traffic. The specific parameters for determining whether traffic exists on a particular path can be defined in the RTD rules and in some instances is based on the manufacturing processes, tool information, lot information, or other factors. If there is not traffic in the route 140 having the shortest distance between the locations 136 and 138, then the method continues to step 414 where it is determined to use the route 140 having the shortest distance. If there is traffic in the route 140 having the shortest distance between the locations 136 and 138, then the method continues to step 416.

At step 416, the method continues by determine whether there is traffic in the route 142 having the second shortest distance between the locations 136 and 138. If there is not traffic in the route 142 having the second shortest distance between the locations 136 and 138, then the method continues to step 418 where it is determined to use the route 142 having the second shortest distance. If there is traffic in the route 142 having the second shortest distance between the locations 136 and 138, then the method continues to step 420. At step 420, the method continues by determine whether there is traffic in the route 144 having the third shortest distance between the locations 136 and 138. If there is not traffic in the route 144 having the third shortest distance between the locations 136 and 138, then the method continues to step 422 where it is determined to use the route 144 having the third shortest distance. If there is traffic in the route 144 having the third shortest distance between the locations 136 and 138, then the method continues to step 424 where it is determined to use the route 146 having the fourth shortest distance. In some embodiments, the method 400 includes additional steps that account for additional routes of increases length between the locations 136 and 138. Similarly, in some embodiments, the method 400 considers fewer routes between the locations 136 and 138.

As noted above, if at step 404 the lot transfer is not a T2T or a S2T transport, then the method 400 continues to step 408. At step 408, the method 400 continues by determining whether the lot to be transported is a super-hot lot or a regular lot. If the lot is a super-hot lot or a regular lot, then the method 400 continues to step 420 where the method continues as described above. If the lot is not a super-hot lot or a regular lot, such as a control wafer lot, then the method 400 continues to step 424 where it is determined to use the route 146 having the fourth shortest distance. Also as noted above, if at step 406 the lot is not a super-hot lot or a regular lot, then the method 400 continues to step 412. At step 412, the method 400 continues by determining whether the lot to be transported is a control wafer lot. If the lot is a control wafer lot, then the method 400 continues to step 424 where it is determined to use the route 146 having the fourth shortest distance. If the lot is not a control wafer lot, then the method 400 continues to step 416 where the method continues as described above. Once the method 400 has determined which route to take at step 414, 418, 422, or 424, the method continues to step 426 where the transfer is executed using the selected route.

It will be recognized that in some embodiments the decisions made in steps 404, 406, 408, and 412 are based on lot information provided by the MES 204. Similarly, in some embodiments the decisions made in steps 410, 416, 420 are based on static and dynamic traffic information provided by the transportation system 208.

Figure 7:
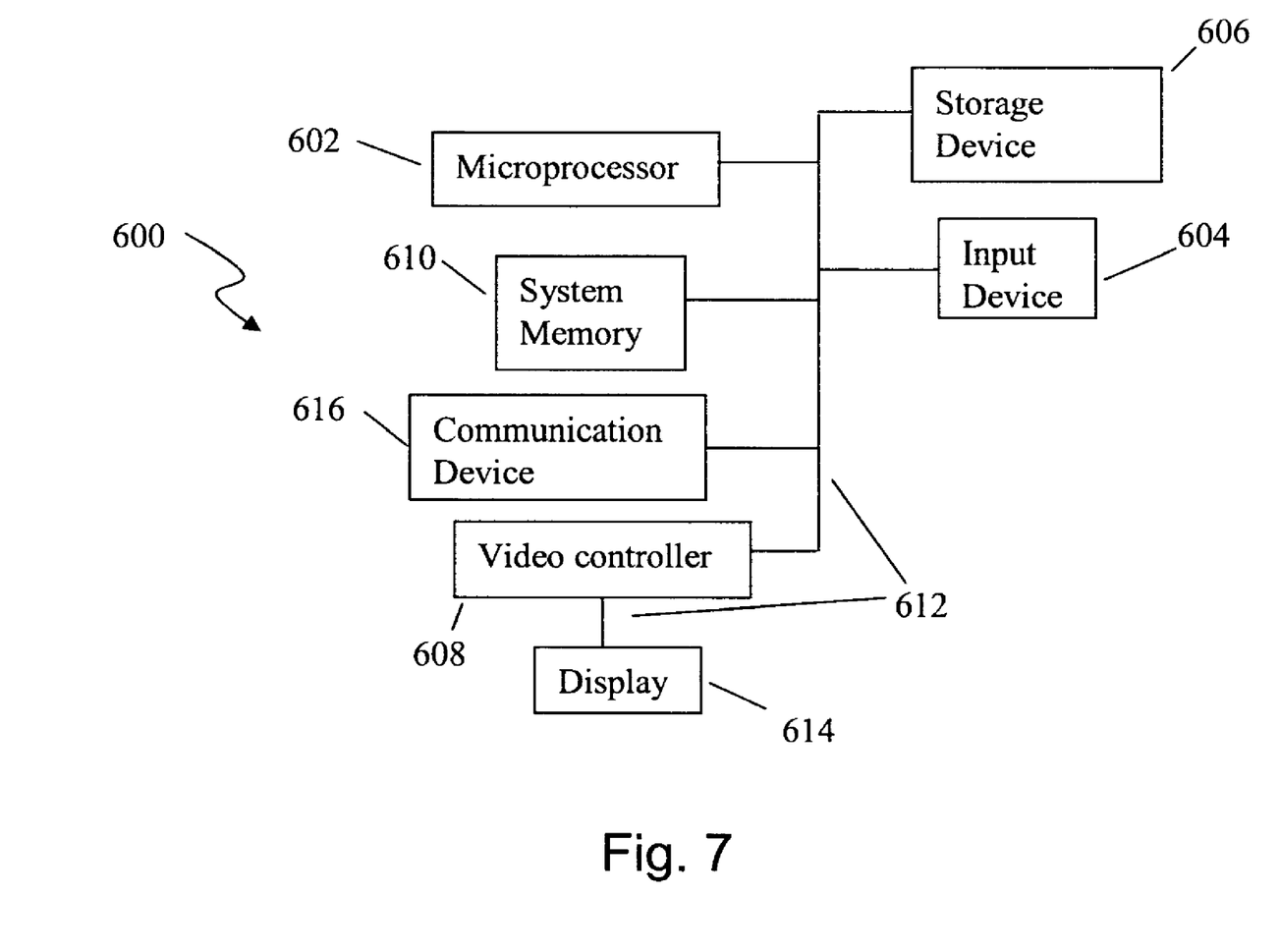
FIG. 7 is an illustrative node for implementing embodiments of the methods of the present disclosure.

Referring now to FIG. 7, shown therein is an illustrative node 600 for implementing embodiments of the methods described above. Node 600 includes a microprocessor 602, an input device 604, a storage device 606, a video controller 608, a system memory 610, and a display 614, and a communication device 616 all interconnected by one or more buses 612. The storage device 606 could be a floppy drive, hard drive, CD-ROM, optical drive, or any other form of storage device. In addition, the storage device 606 may be capable of receiving a floppy disk, CD-ROM, DVD-ROM, or any other form of computer-readable medium that may contain computer-executable instructions. Further communication device 616 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. It is understood that various different combinations of the above-listed processing steps can be used in combination or in parallel. Also, features illustrated and discussed above with respect to some embodiments can be combined with features illustrated and discussed above with respect to other embodiments. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A factory automation system for a wafer fabrication facility ("fab") comprising a plurality of bays, wherein each of the bays comprise a plurality of equipment interconnected by an intrabay overhead transport ("OHT") system, and at least one interbay OHT system for interconnecting the intrabay OHT systems, the factory automation system comprising:
   a manufacturing execution system ("MES") for providing lot information regarding wafers being processed in the fab;
   a material control system ("MCS") for providing dynamic traffic information regarding transportation of wafers in the fab;
   an automated material handling system ("AMHS") for providing static route information regarding transportation of wafers in the fab; and
   a real-time dispatching ("RTD") system for using the lot information from the MES, the dynamic traffic information from the MCS, and the static route information from the AMHS for selecting a destination and a route to the selected destination for a wafer carrier containing wafers in response to a transfer request.

2. The factory automation system of claim 1 wherein the RTD system is configured to send multiple micro commands to the MCS based on the selected destination and route.

3. The factory automation system of claim 2 wherein the RTD system includes a set of RTD rules for selecting the destination and the route.

4. The factory automation system of claim 1 wherein the lot information provided by the MES includes lot priority information.

5. The factory automation system of claim 1 wherein the lot information provided by the MES includes whether the lot is a super-hot lot, a regular lot, or a control lot.

6. A method of implementing a factory automation system for a wafer fabrication facility ("fab") comprising a plurality of bays, wherein each of the bays comprise a plurality of equipment interconnected by an intrabay overhead transport ("OHT") system, and at least one interbay OHT system for interconnecting the intrabay OHT systems, the method comprising:
   receiving a transfer request to move a wafer lot;

obtaining lot information related to the transfer request from a manufacturing execution system ("MES");

obtaining dynamic traffic information related to the transfer request from a material control system ("MCS");

obtaining static traffic information related to the transfer request from an automated material handling system ("AMHS");

using the lot information, the dynamic traffic information, and the static traffic information to select a destination and a route to the selected destination to satisfy the transfer request; and executing the transfer using the selected destination and route to the selected destination.

7. The method of claim 6 further comprising sending a series of multiple micro commands to the MCS based on the selected destination and route.

8. The method of claim 6 wherein the dynamic traffic information includes substantially real-time traffic data.

9. The method of claim 6 wherein the using the lot information, the dynamic traffic information, and the static traffic information to select a destination and a route to the selected destination comprises the steps of:

if the transfer request relates to transfer of a super hot lot or a regular lot, routing the transfer via a first route;

if the transfer request relates to transfer of a control wafer lot, routing the transfer via a second route longer than the first route.

10. The method of claim 6 wherein the using the lot information, the dynamic traffic information, and the static traffic information to select a destination and a route to the selected destination comprises the steps of:

if the transfer request relates to a transfer of a super hot lot or a regular lot to a tool, routing the transfer via a first route unless there is traffic on the first route;

if there is traffic on the first route, routing the transfer via a second route longer than the first route.

11. The method of claim 6 wherein the using the lot information, the dynamic traffic information, and the static traffic information to select a destination and a route to the selected destination further comprises the steps of:

if there is traffic on the first route, routing the transfer via a second route longer than the first route unless there is traffic on the second route;

if there is traffic on the second route, routing the transfer via a third route longer than the first and second routes.

12. The method of claim 6 wherein the obtaining lot information related to the transfer request from a MES comprises obtaining lot priority information.

13. The method of claim 6 wherein the obtaining lot information related to the transfer request from a MES further comprises obtaining information regarding whether the lot is a super-hot lot, a regular lot, or a control lot.

14. The method of claim 6 wherein the using the lot information, the dynamic traffic information, and the static traffic information to select a destination and a route to the selected destination comprises the steps of:

using a real-time dispatcher ("RTD") system to analyze the lot information, the dynamic traffic information, and the static traffic information to select a destination and a route to the selected destination.

15. The method of claim 14 where using the RTD system comprises applying a set of RTD rules to the lot information, the dynamic traffic information, and the static traffic information to select a destination and a route to the selected destination.

16. The method of claim 6 wherein the using the lot information, the dynamic traffic information, and the static traffic information to select a destination and a route to the selected destination further comprises the steps of:

if the transfer request relates to a transfer of a lot to a tool, routing the transfer via a high speed route; and if the transfer request relates to a transfer of a lot to a stocker, routing the transfer via a low speed route.

17. A method of transferring a wafer lot within a wafer fabrication facility ("fab") using a factory automation system, the method comprising:

receiving a transfer request to move the wafer lot from a first position to a second position within the fab;

obtaining lot information related to the transfer request from a manufacturing execution system ("MES");

obtaining dynamic traffic information related to the transfer request from a material control system ("MCS");

obtaining static traffic information related to the transfer request from an automated material handling system ("AMHS");

using the lot information, the dynamic traffic information, and the static traffic information to select a route between the first position and the second position; and executing the transfer using the selected route.

18. The method of claim 17 wherein using the lot information, the dynamic traffic information, and the static traffic information to select a route between the first position and the second position comprises the steps of:

determining a fastest available route;

if the transfer request relates to a transfer of a super hot lot or a regular lot to a tool, routing the transfer via a fastest available route.

19. The method of claim 18 wherein determining the fastest available route comprises the steps of:

determining a first route between the first position and the second position;

determining a second route between the first position and the second position;

utilizing the dynamic traffic information to determine whether the first route or the second route is the fastest available route.

20. The method of claim 17 wherein using the lot information, the dynamic traffic information, and the static traffic information to select a route between the first position and the second position comprises the steps of:

using a real-time dispatcher ("RTD") system in communication with the MES, MCS, and AMHS to analyze the lot information, the dynamic traffic information, and the static traffic information to select the route between the first and second positions.

21. The method of claim 20 wherein the RTD system selects the fastest available route when the wafer lot is a super hot lot or a regular lot.

* * * * *